Dec. 18, 1956     B. D. MENKIN ET AL     2,774,511
TOTE BOX
Filed Jan. 11, 1954     5 Sheets-Sheet 1
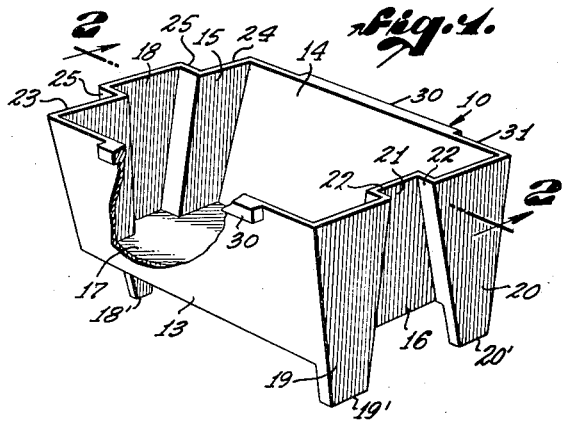
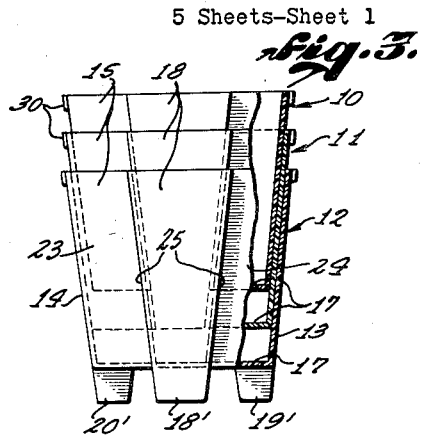
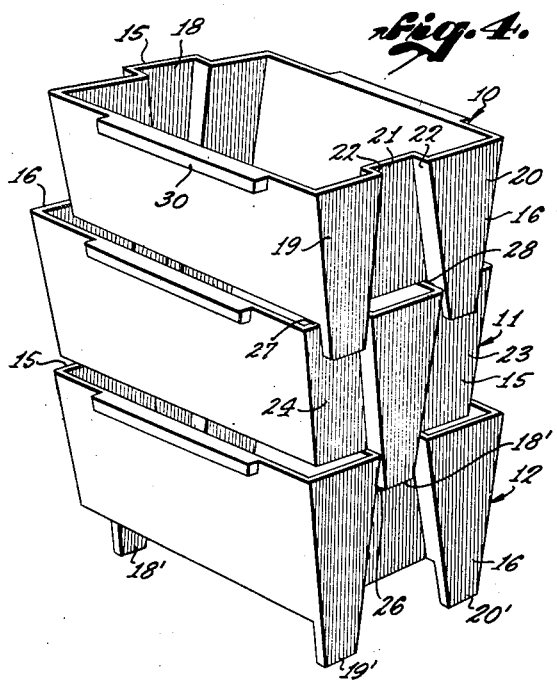
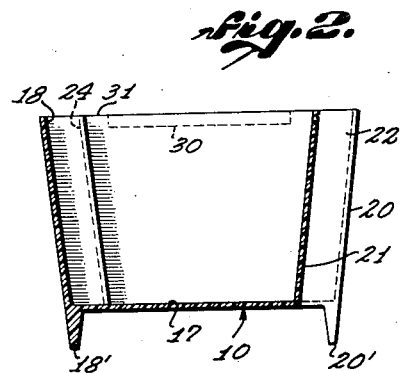
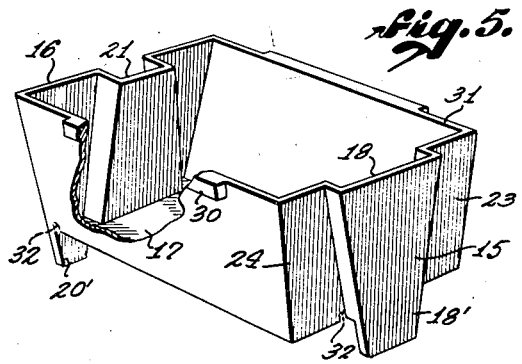
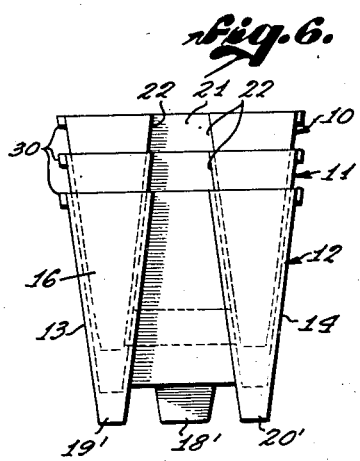
BENJAMIN DAVID MENKIN &
SAADIA M. SCHORR,
INVENTORS.
HUEBNER, BEEHLER,
WORREL & HERZIG,
ATTORNEYS.
BY
Albert M. Herzig

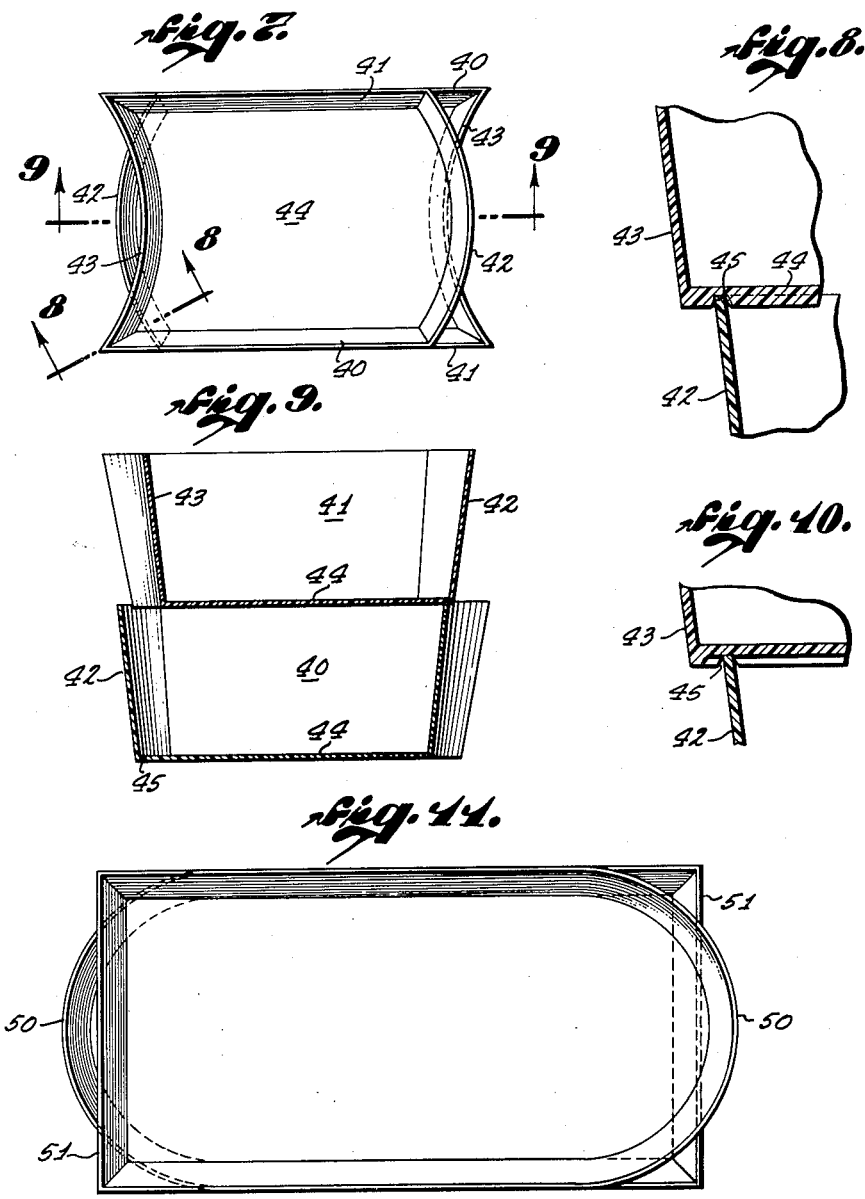

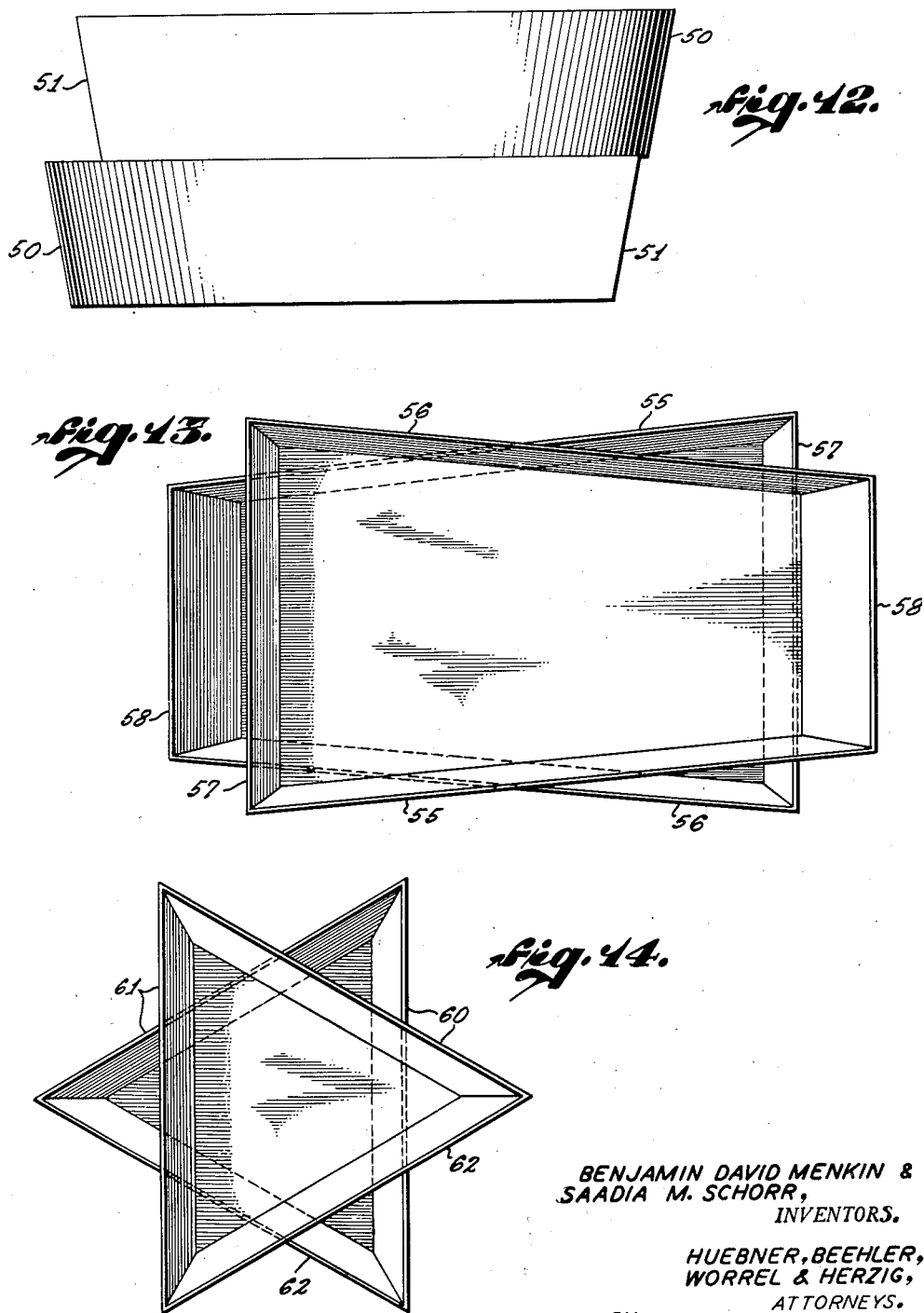

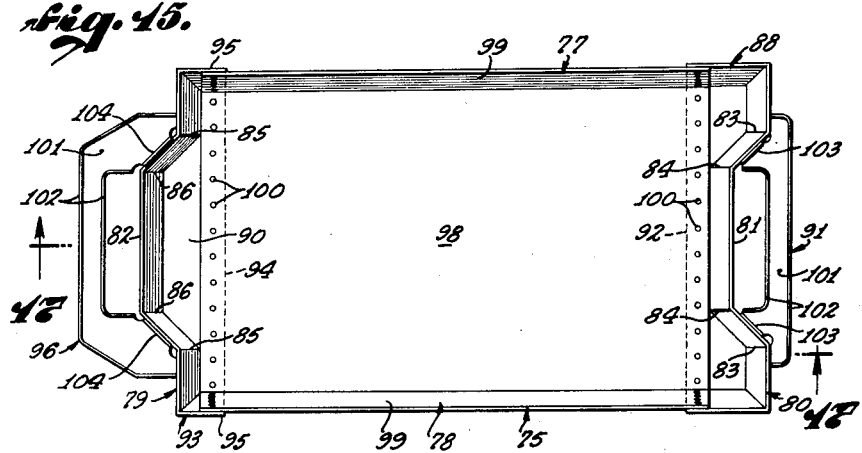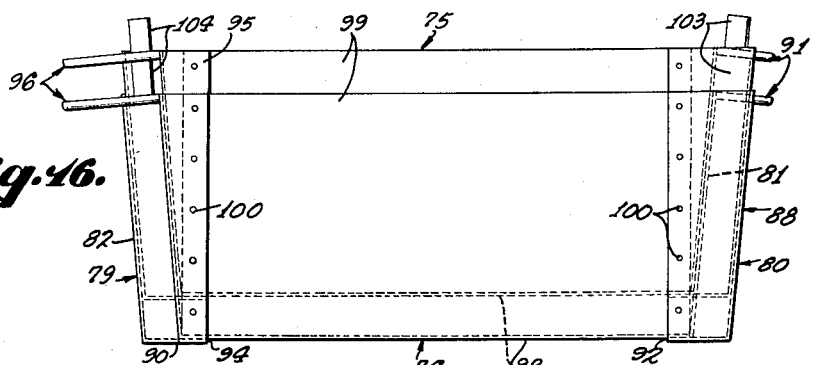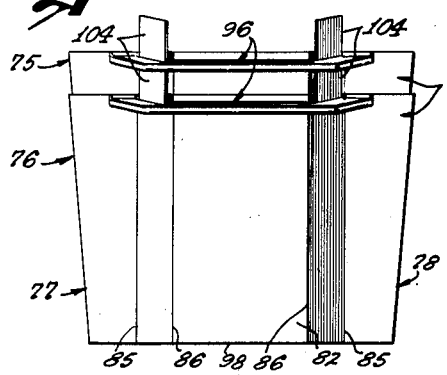

Dec. 18, 1956 B. D. MENKIN ET AL 2,774,511
TOTE BOX
Filed Jan. 11, 1954 5 Sheets-Sheet 5
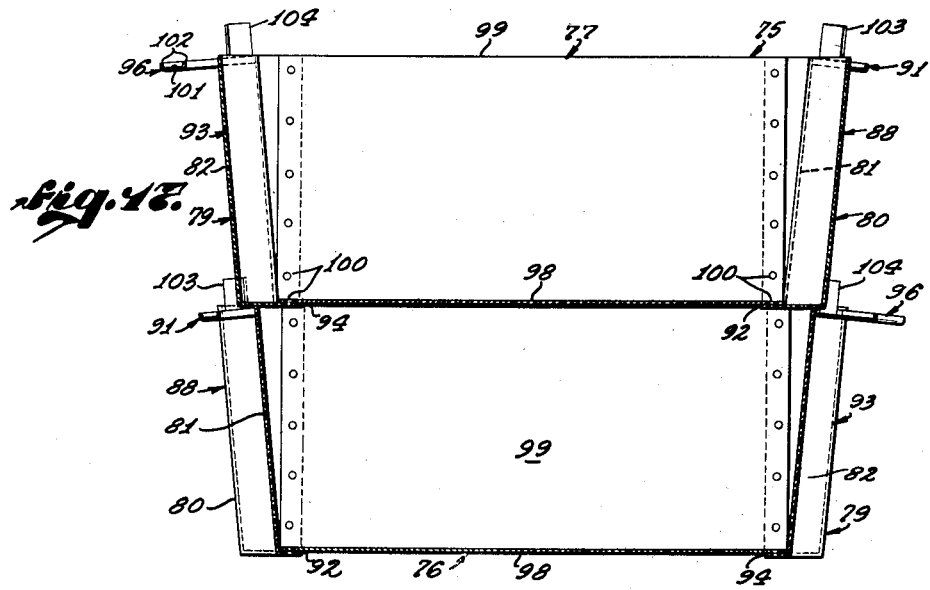
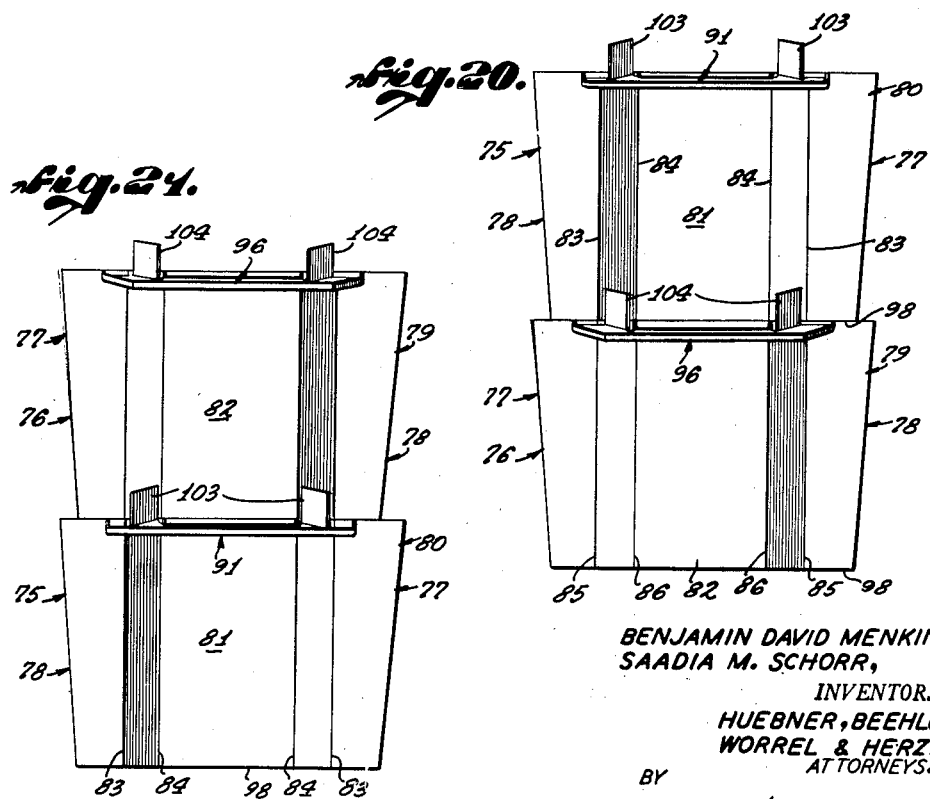
BENJAMIN DAVID MENKIN &
SAADIA M. SCHORR,
INVENTORS.
HUEBNER, BEEHLER,
WORREL & HERZIG,
BY ATTORNEYS.

United States Patent Office 2,774,511
Patented Dec. 18, 1956

2,774,511

TOTE BOX

Benjamin David Menkin and Saadia M. Schorr,
Los Angeles, Calif.

Application January 11, 1954, Serial No. 403,366

1 Claim. (Cl. 220—97)

This invention relates to self-stacking and nesting tote boxes. More particularly, it relates to a tote box which is capable of being nested with another corresponding tote box in a position of correspondency and congruity of the respective boxes; and when the boxes are reversed so that the respective sides of the boxes are in out-of-phase, they may be stacked in such a manner that the contents are undisturbed. In either position the boxes are restrained from relative lateral shifting movement and are, most desirably, interlocked against such movement.

It is an object of this invention to provide a new and improved tote box construction.

It is another object of the invention to provide such a new and improved tote box which, upon reversal with another corresponding tote box, may be vertically stacked therewith while providing a desired clearance for the contents of the respective boxes.

It is another further object of the invention to provide a new and improved self-stacking and tote box combination with new and improved interlocking and stacking features.

Still another object of the invention is the provision of a new and improved self-stacking and nesting tote box of the desired character described incorporating new and improved nesting and/or stacking features.

Another further object of the invention is the provision of a self-stacking and nesting tote box having an improved convenient manipulative and easily manufactured construction whereby the boxes made in accordance with the invention can be molded as from one uniform mass of plastic or other moldable material. It is thus an object to provide a box of the character described which is capable of facile manufacture and economical reproduction by mass production methods.

Other object of the invention comprehend the provision of improvements over prior art devices heretofore intended to accomplish generally similar purposes.

With these and other objects in view, the invention consists in the construction, arrangement and combination of the various parts of the device whereby the objects contemplated are attained as hereinafter set forth, pointed out in the appended claim and illustrated in the accompanying drawings.

In the drawings:

Figure 1 is a perspective view, parts being broken away, of a self-stacking and nesting tote box embodying this invention.

Figure 2 is a vertical sectional view taken as on a line 2—2 of Figure 1.

Figure 3 is a first end view, parts being cut away, of a plurality of such boxes embodying this invention in nested relationship to one another.

Figure 4 is a perspective view showing said plurality of boxes in a stacked relationship to one another.

Figure 5 is a perspective view, parts being broken away, similar to Figure 1, but from the opposite side thereof.

Figure 6 is an end view of said tote boxes in nested relationship similar to Figure 3 but from the opposite end of said boxes.

Figure 7 is a top view showing two tote boxes embodying this invention, in a stacked relationship to one another, said tote boxes having curved end sections.

Figure 8 is a vertical sectional view taken as on a line 8—8 of Figure 7.

Figure 9 is a front view of the tote boxes in a stacked relationship as shown in Figure 7.

Figure 10 is similar to Figure 8 but shows the circumferential walls extending beyond the bottom section of the tote box to form a raised support therefor.

Figure 11 is a top view of another embodiment of tote boxes in a stacked relationship.

Figure 12 is a front view of the tote boxes shown in Figure 11.

Figure 13 is a top view of still another embodiment of tote boxes in a stacked relationship.

Figure 14 shows a top view of two triangular tote boxes embodying this invention in a stacked relationship.

Figure 15 is a top view of a still further modified form of tote box embodying this invention.

Figure 16 is a vertical view in elevation showing two such boxes in nested relationship.

Figure 17 is a vertical sectional view as on a line 17—17 of Figure 15, showing two such boxes in stacked relationship.

Figure 18 is a vertical elevational view as of the right-hand side of Figure 16.

Figure 19 is a vertical elevational view as of the left-hand side of Figure 16.

Figure 20 is an elevational view of the ends of the boxes of Figure 17, taken from the right-hand side of said figure.

Figure 21 is a left-end view of the tote boxes illustrated in Figure 17.

Referring more particularly to the drawings, there is shown by way of illustration, a plurality of tote boxes generally designated, respectively, as 10, 11 and 12. Each of said boxes comprises preferably tapered opposed sides 13 and 14 and correspondingly preferably tapered end walls 15 and 16.

The end walls 15 and 16, and the side walls 13 and 14, mutually tapered downwardly towards and are integral with a bottom 17.

The first end 15 has a centrally located wedge-shaped section 18 extending outwardly therefrom and tapering from the top of the box to its base, i. e., at least to the plane of the bottom of the box, although the same may be extended downwardly and preferably is so extended below the bottom of the plane of the box as will be described. The second end 16 of the box is formed with two such wedge-shaped sections 19 and 20, which are defined as similarly projecting from the surface of the box proper, a portion of the end wall at which may be considered its normal dimensions defining a wedge-shaped recess 21 tapering upwardly between the wedge-shaped sections 19 and 20, defining shoulders 22 therebetween. In a similar manner the first end 15 may be considered as having a normal pair of wall segments 23 and 24 defining therebetween outwardly extending shoulders 25.

All of the above described surface contours are preferably produced by shaping the sides and ends of the boxes to the desired wedge-shaped sections while maintaining an even wall thickness.

The resulting contour above described is such as to allow one box to nest and enter into another if they are aligned with the first ends 15 of both boxes in the same direction and correspondingly both second ends 16 faced in the opposite direction.

When the boxes are reversed the first end 15 of the top box will be over the second end 16 of the bottom box and similarly, the second end 16 of the top box will be over the first end of the bottom box. In this position the centered wedge 18 of the first end 15 which is projecting outwardly from the normal end of the box will lie directly over the recessed section 21 of the second end of the bottom box.

Similarly, the two raised wedges of the second end of the top box will lie directly over the two recessed sections 23 and 24 of the first end of the bottom box.

The configuration of the boxes is such that in the above described positions the top box, which may be considered box 10 with respect to box 11, or box 11 with respect to box 12, will be supported by the bottom box, which, in the drawings, may be considered box 11 with respect to box 10, or box 12 with respect to box 11, at the three stations 26, 27 and 28, where the wedge-shaped sections are out-of-phase. If the wedge-shaped sections 18, 19 and 20 are respectively extended below the bottom 17 of the box, they will enter into the corresponding recesses of the opposite ends and lock the two tote boxes into position in a manner effectively preventing any front and back, or lateral shifting movement, that is, sidewise or endwise.

In the nested position of the boxes, as shown in Figures 3 and 6, with both of the first ends 15 and both of the second ends 16 aligned on the same side—that is, one above the other—such continuations or downward extensions of the wedge-shaped sections, as at 18', 19', or 20', will serve the additional purpose of providing feet by which the upper box will rest on the bottom of the inside of the next lower box and thereby prevent the wedging and binding of the two boxes within one another.

This latter desired result can also be accomplished by providing outwardly extended lugs or handholds 30 at the top margin, for example, of the respective sides 13 and 14, such handholds engaging against the top edges 31 of the underlying box and preventing the top box from entering far enough into the lower box to bind therein.

By providing the lugs 30 it is possible to eliminate the feet 18', 19', and 20', or, if such legs are desired, in any event, they may be made shorter and hence stronger to prevent frontal and lateral shift.

If the legs or feet 18', 19', or 20' are so omitted, or even if they are not, it is sometimes advantageous to form grooves, such as 32, along the bottom adjacent the respective ends of the boxes, said grooves corresponding to the configuration of the top edges 31 of the opposite end of any underlying box. Said grooves may serve merely to reinforce the action of the legs 18', 19', and 20', or may substitute for such legs.

It is desirable that the proportioning of the wedged extensions and recessed sections be such that their side-to-side dimensions correspond closely to the side-to-side dimensions of the complementary sections or recesses with which they are adapted to interfit in order that a minimum of side-to-side shifting movement of the boxes will occur. In similar manner it is desirable that the inside measurement between the legs 19' and 20' of any box, and the leg 18' of the same box, correspond closely to the over-all dimensions of the end-to-end dimensions of the top edge 31 of the box on which it is adapted to stack or rest.

Manifestly, it is possible to stack any number of boxes or to nest any number of boxes together, limited only by their stability and particular design. The legs make for self-centering due to their tapered construction, and therefore provide a high degree of stack rigidity and alignment. The no-shifting feature by which the boxes interlock in the stacked position also makes movement of a stack of boxes on a pallet convenient and practical where lateral shifting movement of the boxes relative to one another would otherwise be an extreme deterrent.

In addition to the above advantages, it is apparent that the centrally located projecting wedge section 18 of the first end 15 makes a natural spout to facilitate the pouring of small parts, or even liquids, from the tote box.

The sides and ends with their wedge-shaped projections actually create a corrugated section which has greater mechanical strength than a straight end wall.

It is a further advantage of this design and construction that with variations in the ability of one skilled in the art the box is capable of being molded or formed of one integral piece.

The above-described embodiment may be varied without departing from the scope of this invention. One example of such variation is shown in Figures 7 to 9 which illustrate top and front views, respectively, of two tote boxes in a stacked relationship. Each of said boxes comprises preferably tapered, opposed sides 40 and 41, and correspondingly tapered end walls 42 and 43, which are in the form of segmented arcs. The end walls 42 and 43, and also the sides 40 and 41, mutually taper downwardly towards and are integral with a bottom 44. In the bottom 44 are four recessed sections 45, which are positioned to receive the end sections of similar tote boxes in a stacked relationship, as shown in these figures. Figure 8 and Figure 10 show the top of end wall 42 in recess 45 in the bottom of the upper tote box in order to lock the two tote boxes into position for preventing relative shifting movement. Figure 8 shows a solid bottom 44, and Figure 10 shows an extension extending beyond the bottom to form a raised support and thus providing additional clearance between boxes.

Similarly, Figures 11 and 12 show another embodiment of this invention wherein end walls 50 and 51 are semi-circular and straight in form, respectively. Figure 13 shows another form of the tote boxes, wherein each tote box has sides or side walls 55 and 56, and end walls 57 and 58, to form a circumferential wall; the opposite side walls 55 and 56 mutually taper inwardly from end wall 57 toward end wall 58. In Figure 14, each tote box has three walls 60, 61 and 62, forming a triangular configuration. As in the previously described embodiments, the end walls and sides of these variations mutually taper downwardly and are integral with a bottom. Also, each bottom of the tote boxes has appropriately positioned recesses to receive the walls of a similar tote box when superimposed in a stacked relationship.

Referring now to the modification and embodiment of Figures 15 through 21, there are shown individual tote boxes 75 and 76, respectively.

Each such box 75 and 76, includes opposed upwardly flared and tapered side walls 77 and 78, and flared and tapered end walls 79 and 80.

The end wall 80 is offset inwardly, as at 81, in a complementary fashion, to an outward offset 82, in the end wall 79. The offsets 81 and 82 are preferably formed by vertical foldlines 83 and 84 on each side of the central offset wall portion 81. Similarly, preferably vertical foldlines 85 and 86 on each side of the central outwardly offset end portion 82 form the desired contour of the end wall 79. Said foldlines 83, 84, 85 and 86 are considered vertical if viewed from the ends of the box, and flare outwardly with the sides 79 and 80 if viewed from a side of the box.

Whether said foldlines are parallel to one another on each end of the box or not, they provide vertical stiffness and increase the strength of the ends of the box against downward compressive forces occasioned by the stacking of a number of loaded boxes one upon the other. Such vertical strengthening by vertical fluting, bending or the like, of the ends of the box, is of importance in that it permits the use of relatively light-weight material whose resistance to vertical compressive forces is thereby at a desired maximum while at the same time providing an inherent end wall design which permits selective stacking or nesting of the boxes when they are relatively congruent, or 180° out of phase, i. e. rotated from said position of congruency, respectively.

In the instant embodiment it has been found desirable to form the boxes with an end section 88 molded integrally of any suitable reinforced plastic material. Thus, the entire end portion of the box outwardly of a line such as 92, can be integrally molded. So, too, the opposite ends 93 outward of the line 94, defining the inner edge of said molded section, may be formed of one piece of reinforced plastic or any other suitable formable material. Such other end portion 93 accordingly comprises the entire end wall 82, bottom portion 90, and side wall portions 95, as well as a handle 96.

If so constructed in integral but separate end portions, the box may be assembled with a central body portion, including a bottom portion 98 having upturned side portions 99 formed therein. The end portions 88 and 93 may then be assembled together with the central portions 98, 99, as by rivets or other suitable fastening means 100. In such event, while the end sections may be made of a molded material such as plastic, the central section 98, 99 may be formed of other sheet materials, if desired, such an aluminum, or the like. By the use of these materials, separately or in combination, a tote box of the instant design can be mass-produced at a considerable saving in time and material over prior art devices heretofore made and sold.

The handles 91 and 96 preferably comprise a horizontally extending main body portion 101 reinforced by unstanding marginal flange portions 102. Each handle or end wall corresponding thereto is advantageously formed with one or more upturned ears 103 at either side of the handle 91, for example, or 104 at either side of the handle 96.

By such construction the ears which project above the upper marginal edge of their respective boxes are disposed upon opposite sides of the offset central portions 81 and 82 of the box end to restrain the stacked boxes against lateral or endwise movement. Such ears may, moreover, be adapted as shown to engage against the handle of a superjacent nested box to prevent said nested box from wedging or falling down too far into a box in which it is nested.

If desired, however said upturned ears can be shaped, offset or otherwise provided with clearance so that they do not engage against the handles or other parts of a superjacent nested box, whereupon the handles 91 and 96 will engage against the top edge of the corresponding end of the nether box to prevent said undesired wedging of the nested boxes, one within the other.

The bottoms of the nested boxes are thus prevented from coming too close together and clearance between the handles is provided for manipulative access by an operator engaged in lifting the nested boxes out of one another.

By the instant construction, the offset fluted or otherwise vertically reinforced ends or opposed wall portions of the boxes are adapted to sustain the entire load of any superimposed stacked box. Thereby the strongest wall portion carries the entire load. It is also of importance that the opposed wall portions which are vertically reinforced are correspondingly offset, fluted, corrugated, curved or the like, in the same direction so that in the nested condition of the boxes, the corresponding offsets face in the same direction and interfit with one another, while in a position of reversal or 180 degree rotation respecting one another, said offsets are out of phase and the bottom of one box is thereby disposed to rest upon the upper edge of the bottom box. Handles and/or other suitable means may be depending from the box or upstanding therefrom, or both permitting one box to engage, interfit with, or lie over or astride the top edge of the other box so that horizontal shifting movement of the stacked boxes is prevented.

Each of the above described embodiments provides for easily manufactured nesting tote boxes which upon reversal with other similar tote boxes may be vertically stacked and interlocked.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claim so as to embrace any and all equivalent devices.

Having herein described our invention, what we claim as new and desire to secure by Letters Patent is:

A tote box having a bottom and upwardly and outwardly extending opposed side walls and end walls, one of said walls comprising a first centrally located outwardly open channel-shaped portion of substantial width lying inwardly of the normal plane of said wall, the wall opposite said one wall comprising a second centrally located inwardly open channel-shaped portion of substantial width lying outwardly of the normal plane of its wall, said channel-shaped portions extending the height of said walls and being open-ended at the top thereof, said outwardly open channel being also open-ended at the bottom thereof, whereby a plurality of said boxes may be nested one within the other with their corresponding channels superimposed or stacked one upon the other with an outwardly facing channel overlying an inwardly facing channel, and interengaging means at the top and bottom edges of said opposed walls preventing relative lateral movement between stacked boxes comprising handles adjacent the upper edges of said opposed walls, said handles each having upstanding portions engaging side portions of the channel of a similar box stacked thereon.

References Cited in the file of this patent

UNITED STATES PATENTS

| | | |
|---|---|---|
| 558,961 | Jones | Apr. 28, 1896 |
| 649,258 | Peacock | May 8, 1900 |
| 1,469,645 | Kobbe | Oct. 2, 1923 |
| 2,064,518 | Brogden | Dec. 15, 1936 |
| 2,314,835 | Johns et al. | Mar. 23, 1943 |
| 2,457,841 | Smith et al. | Jan. 4, 1949 |
| 2,596,881 | White | May 13, 1952 |
| 2,655,283 | Moldt | Oct. 13, 1953 |

FOREIGN PATENTS

| | | |
|---|---|---|
| 874,426 | Germany | Apr. 23, 1953 |